United States Patent [19]
Owen

[11] Patent Number: 5,826,178
[45] Date of Patent: Oct. 20, 1998

[54] LOOP ANTENNA WITH REDUCED ELECTRICAL FIELD SENSITIVITY

[75] Inventor: Jeffrey R. Owen, Portland, Oreg.

[73] Assignee: Seiko Communications Systems, Inc., Beaverton, Oreg.

[21] Appl. No.: 592,908

[22] Filed: Jan. 29, 1996

[51] Int. Cl.⁶ .................................................. H04B 1/18
[52] U.S. Cl. .................. 455/193.1; 455/129; 455/121; 343/742; 343/741
[58] Field of Search ............................ 455/129, 193.1, 455/121, 122, 123, 562, 575; 343/742, 741, 744

[56] References Cited

U.S. PATENT DOCUMENTS

| | | | |
|---|---|---|---|
| 2,535,053 | 12/1950 | Ercolino | 343/748 |
| 2,657,312 | 10/1953 | Saranga | 343/744 |
| 3,641,576 | 2/1972 | Farbanish | 343/743 |
| 4,433,336 | 2/1984 | Carr | 343/728 |
| 4,879,570 | 11/1989 | Takizawa et al. | 343/713 |
| 5,225,847 | 7/1993 | Roberts et al. | 343/745 |
| 5,337,061 | 8/1994 | Pye et al. | 343/702 |

Primary Examiner—Reinhard J. Eisenzopf
Assistant Examiner—Darnell R. Armstrong
Attorney, Agent, or Firm—Elmer Galbi

[57] ABSTRACT

A small, high Q loop antenna configured on a printed circuit board as a planar structure receives a radio signal and shields its interior planar area against interfering electric field energy while concentrating therein radio signal magnetic flux. A magnetic pickup loop, coplanar to the antenna loop and magnetically coupled thereto, receives the radio signal power by virtue of its magnetic coupling to the loop antenna. The magnetic pickup loop couples to a receiving device and delivers the radio signal thereto. Illustrated embodiments include loop antennas tunable to a desired resonant frequency.

2 Claims, 5 Drawing Sheets

LOOP ANTENNA WITH REDUCED ELECTRICAL FIELD SENSITIVITY

BACKGROUND OF THE INVENTION

The present invention relates generally to communication devices, and particularly to radio signal communication devices used in combination with devices emitting radio frequency interference.

The current trend in electronic product lines is reduced size and increased portability. Laptop and palmtop computers are examples of this trend. Smaller devices typically have greater consumer appeal. Portability, e.g., by way of battery power sources, in combination with small size supports a broad spectrum of personal applications. Many such devices, however, operate at sufficiently high frequencies and power levels to produce radio frequency interference or noise affecting nearby radio signal communication. Such devices are regulated by law and often must be shielded to avoid emission of radio signal interference. Even with shielding, radio frequency interference in the immediate vicinity of a computing device is, as a practical matter, difficult to eliminate.

Portable computing devices can be part of a communication system interacting by way of radio signal. Use of radio signals as a communication link further supports portability and further expands the range of applications available for such devices. When combining a device producing radio signal interference, e.g., a portable computing device, with a radio signal receiving device, e.g., to establish a remote wireless link to the portable computing device, interference with radio signal communication must be minimized to establish a useful and reliable product.

Since for many computing devices most of the energy is electric rather than magnetic, stray capacitance is often the primary medium coupling energy from the high frequency computing device circuitry to the antenna. A computing device includes internal circuitry containing conductors and elements with varying voltage operating at radio signal frequencies. Such circuit activity produces radio frequency interference, i.e., RF energy, in the vicinity of the computing device. One solution to the problem of stray capacitance is to physically separate the antenna, i.e., the active portion of the antenna, relative to the computing device. This minimizes stray capacitance, and thereby minimizes the magnitude of capacitive coupling between the computing device and the antenna. Unfortunately, the length of antenna extension required often is larger than desired for a portable device.

A second potential solution to the problem of radio frequency interference is use of an electrical dipole antenna with differential feeds. Suitably positioning the dipole antenna relative to the surrounding radio frequency interference can nullify interference by balancing stray capacitance. Unfortunately, this cannot be done for every direction and some of the sources of electric field energy remain as sources of interference. Requiring the user of the computing device to precisely adjust the orientation of the dipole antenna, however, may be an undesirable product requirement.

Conventional loop antennas can be used, but still suffer interference due to capacitive coupling of RF energy as a result of orientation and position relative to the computing device.

Given a product requirement of small overall size, it is desirable to avoid large elements such as conventional antennas, i.e., large antennas. Unfortunately, the use of a radio signal communication link and associated antenna often frustrate this design criteria, i.e., the inevitable presence of radio signal interference requires a large separation between the computing device and the antenna. It would be desirable, therefore, to provide a small, low-loss antenna capable of operating reliably in the presence of electric field radio frequency interference found in and around computing devices.

SUMMARY OF THE INVENTION

A radio signal receiving device under the present invention includes a planar antenna loop structure and a magnetic pickup device coplanar to and located within the antenna loop structure. A radio signal receiving device couples to the magnetic pickup device.

One or more capacitors are interposed in series along the antenna loop structure to establish a selected resonant frequency, tuning the antenna. The antenna of the present invention may be implemented as conductive traces on a printed circuit board.

A method of receiving a radio signal under the present invention includes the steps of providing by conductive loop structure a shielded planar region, the planar region being shielded against tangential electric field energy, and magnetically coupling the loop structure to a coplanar magnetic pickup device located within the loop structure. A differential radio signal is then taken from the magnetic pickup device. Series capacitance located at two symmetrically opposite locations on the loop structure balances current flow therein, and thereby nullifying interfering magnetic flux induced in the magnetic pickup device. Variable capacitance elements may be used to establish selected tuning of the loop structure.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION OF THE PREFERRED EMBODIMENT

Figure 1:
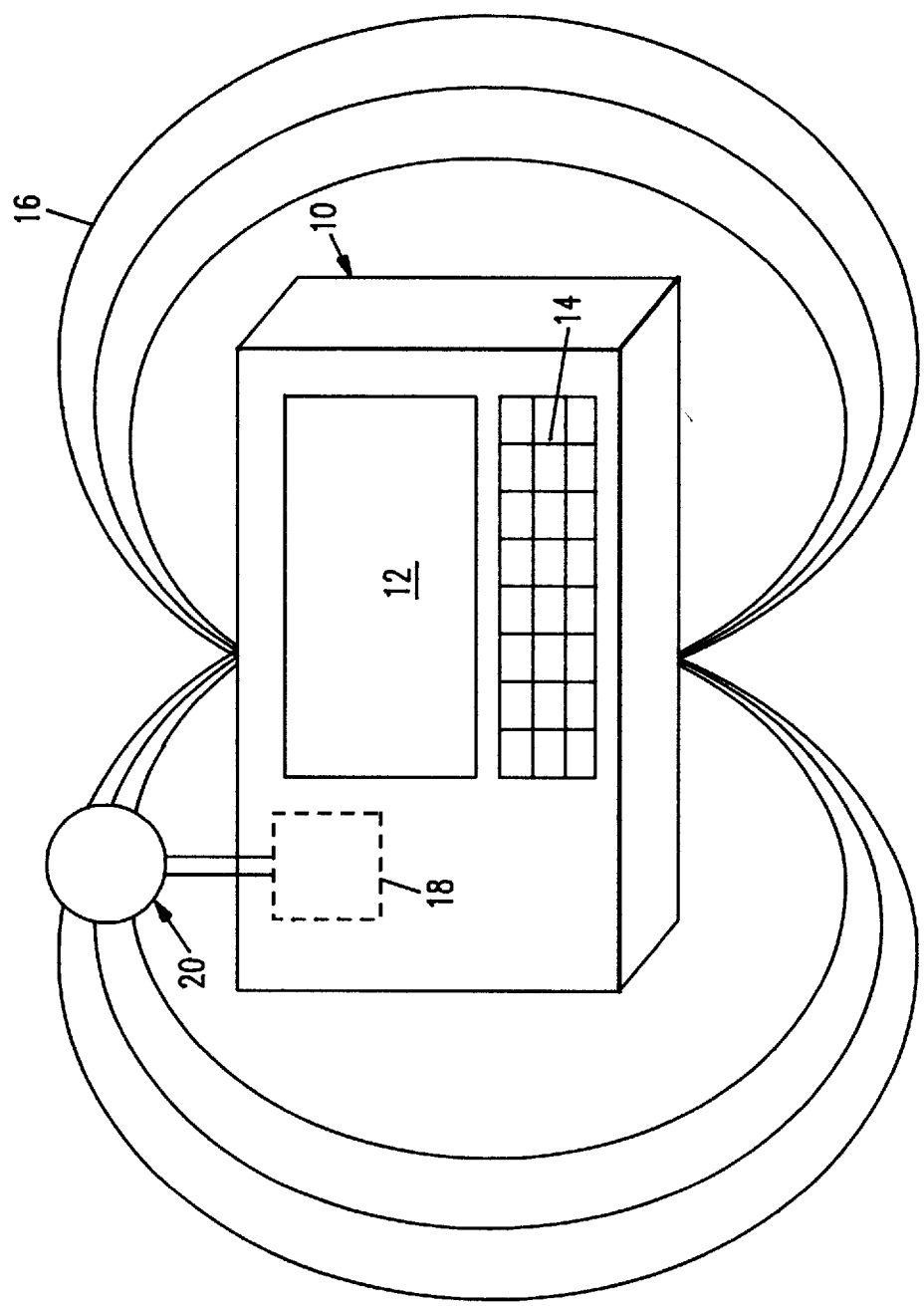
FIG. 1 illustrates a computing device producing interfering electric field energy and an antenna with reduced sensitivity to interfering electric field energy.

FIG. 1 illustrates a small, portable computing device 10, e.g., a portable laptop computing device, including a display 12 and keyboard 14. The circuitry of device 10 operates at sufficiently high frequency to produce radio frequency interference (RFI) 16, primarily electric field interference. Device 10 further includes radio signal receiving circuitry, i.e. receiver 18, and a small, high Q loop antenna 20 according to a first embodiment of the present invention.

Figure 2:
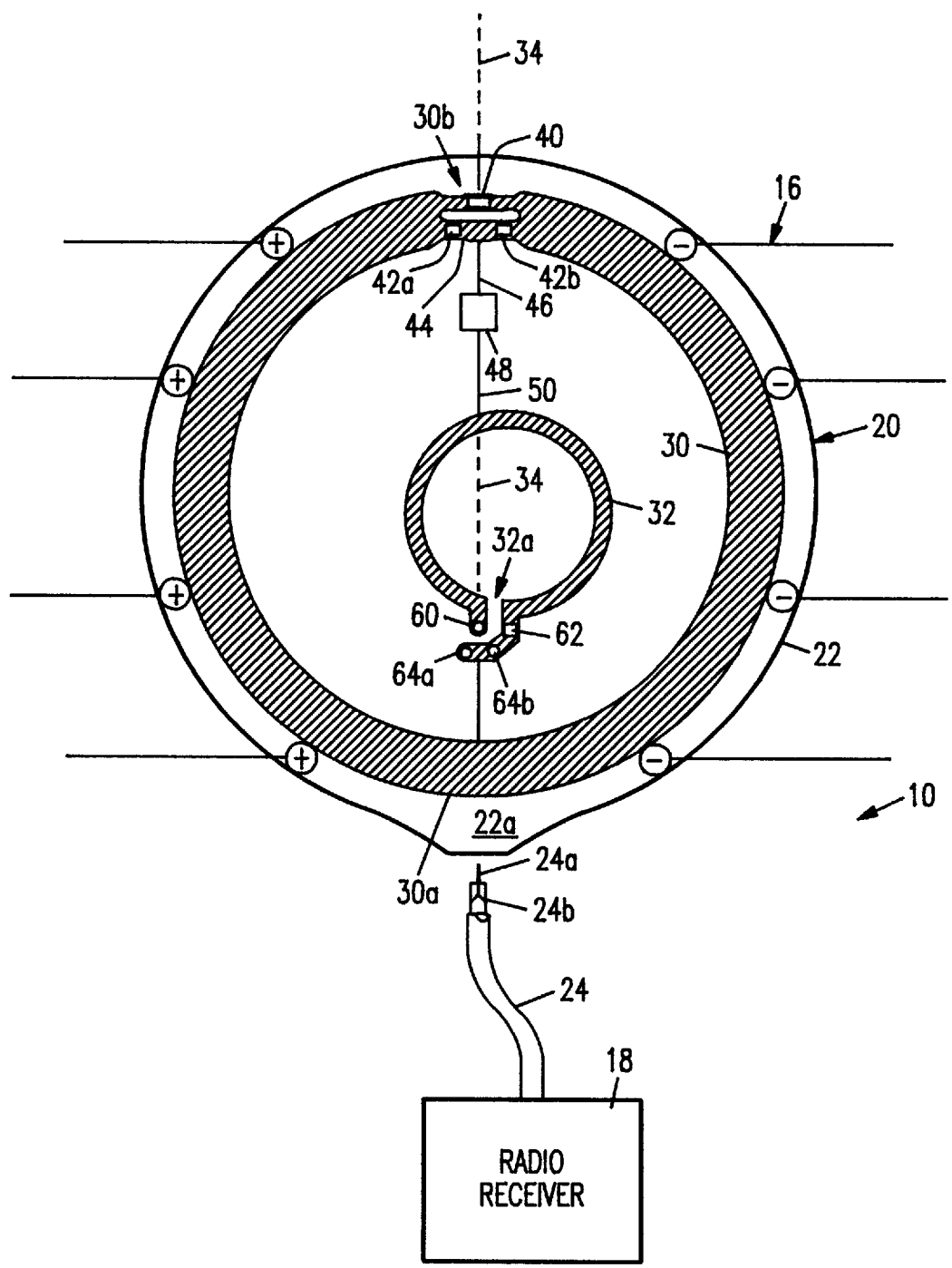
FIG. 2 further details the antenna of FIG. I as implemented on a printed circuit board.

In FIG. 2, antenna 20 is implemented on a printed circuit board 22 and couples to receiver 18 by way of co-axial cable 24, shown disconnected in FIG. 2 to better illustrate loop antenna 20. Antenna 20 includes an antenna loop 30 and an inner magnetic pickup loop 32. Those magnetic flux lines of the impinging radio signal that pass through the interior of antenna loop 30 excite a uniform oscillating current around antenna loop 30, producing a concentrated magnetic flux within and around antenna loop 30. Antenna loop 30 shields its planar interior area against interfering tangential electric fields. A concentrated magnetic flux derived from the radio signal received by antenna loop 30 exist, however, within the electrically shielded planar interior of antenna loop 30. Magnetic pickup loop 32, within the plane of antenna loop 30, reacts to the concentrated magnetic flux and couples RF power to co-axial cable 24.

While illustrated and discussed primarily with reference to receiving radio signals, the present invention may be used to transmit a radio signal as well. If RF power is applied to loop 32, e.g., by means of cable 24, it will be magnetically coupled to antenna loop 30 for transmission.

Loops 30 and 32 are conductor traces on printed circuit board 22. As may be appreciated, the manufacture of antenna 20 on printed circuit board 22 is relatively inexpensive. Further, the designer has significant control over features such as the size and relative placement of each of loops 30 and 32 upon circuit board 22. Antenna loop 30, a circular structure upon the planar surface 22a of board 22, lies symmetrically relative to an axis of symmetry 34. Generally, for VHF or lower magnitude frequencies, antenna loop 30 is made as large in diameter as possible given overall size and design constraints of computing device 10. Magnetic pickup loop 32 also lies upon the planar surface 22a, i.e., is co-planar with antenna loop 30, and, as discussed more fully hereafter, lies offset relative to axis 34. Size variation in magnetic pickup loop 32 accomplishes impedance matching between antenna loop 30 and co-axial cable 24 by varying the number of magnetic flux lines passing through the interior of magnetic pickup loop 32.

Antenna loop 30 includes a null point 30a and a break 30b, both along axis of symmetry 34. Selected magnitude series capacitance across break 30b tunes antenna 20. More particularly, a high Q capacitor 40 lies in series across break 30b and limits the range of capacitance variation across break 30b and improves the Q for antenna 20. A pair of matched voltage variable capacitors (varactors) 42, individually 42a and 42b, also lie in series across break 30b with a conductive trace 44 therebetween. A selected DC voltage provided at trace 44 tunes antenna 20 to a selected radio signal frequency.

The DC tuning voltage arrives by way of the center conductor 24a of co-axial cable 24. A conductive trace 46 couples trace 44 to an inductor 48 and a conductive trace 50 couples the opposite side of inductor 48 to magnetic pickup loop 32. Each of traces 46 and 48 as well as inductor 50 lie along axis of symmetry 34. Inductor 48 blocks radio signal energy present at trace 44, caused by varactors 42 asymmetry, from entering magnetic pickup loop 32, but allows delivery of the DC tuning voltage at trace 44.

Magnetic pickup loop 32 includes a break 32a. A first side of break 32a defines a terminal 60 lying along axis of symmetry 34. The second side of break 32a couples through a capacitor 62 to terminal 64, shown in FIG. 2 as two coupling points 64a and 64b spanning axis of symmetry 34. Capacitor 62 blocks the DC tuning voltage, but does not block the high frequency radio signal. In coupling co-axial cable 24 to antenna 20, cable 24 lies along axis of symmetry 34 with the center conductor 24a electrically attached to terminal 60 and the shield conductor 24b electrically attached to terminal 64, specifically by means of an inverted U-shaped solid wire soldered to coupling points 64a and 64b.

The magnetic pickup loop 32 is offset, i.e., not centered within loop 30, to minimize the effective capacitance between the loops 30 and 32. Actual positioning of the offset location for magnetic pickup loop 32 can be accomplished experimentally, or through use of computer modeling tools using finite element techniques. The intent in such offset positioning is to minimize the capacitive coupling of RF power between the loops 30 and 32 by taking into account the relatively stronger signal voltage locations of each loop structure, i.e., maximum signal voltage at terminal 60 and no voltage at terminal 64 for loop 32; and maximum signal voltage at break 30b and no signal voltage at null point 30a for loop 30.

Figure 3A:
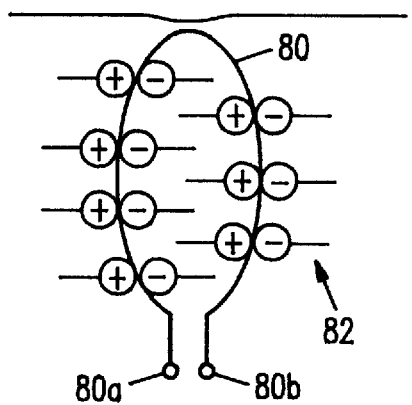
FIGS. 3A–3C illustrate a conventional loop antenna and several relative orientations to an interfering electric field such as produced by an adjacent computing device.
Figure 3B:
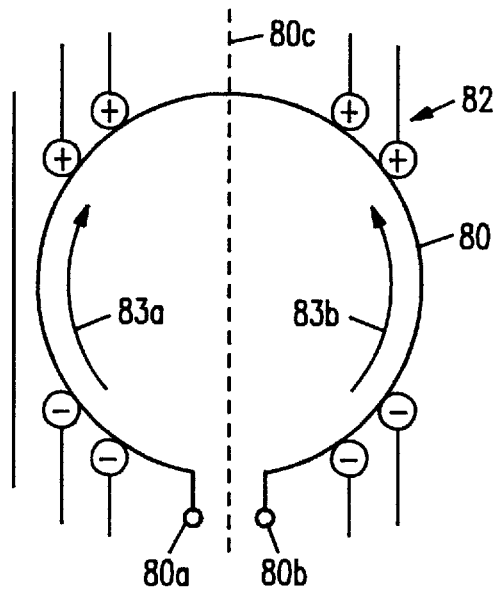
Figure 3C:
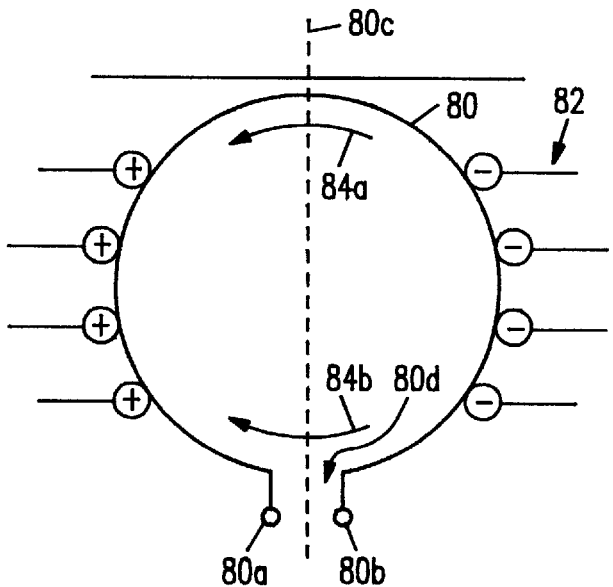

FIGS. 3A–3C illustrate interaction between a conventional loop antenna 80 and a surrounding electric field 82, e.g., originating from a nearby computing device, for three orthogonal orientations therebetween. In FIG. 3A, field 82 lines are perpendicular to the loop 80, i.e., perpendicular to the plane of loop 80. In such relative orientation, currents flow from one surface of the loop to the opposite surface, e.g., transversely front to back, and no currents flow around loop 80 as a result of field 82. No net current results with respect to contacts 80a and 80b of loop 80. In FIG. 3B, field 82 lies tangential relative to loop 80 and parallel to the axis of symmetry 80c for loop 80. In such orientation, currents 83a and 83b flow up or down but no net current results between contacts 80a and 80b as a result of electric field 82. Thus, the relative orientations for loop 80 and field 82 as shown in FIGS. 3A and 3B illustrate no radio frequency interference, i.e., no net current induced at terminals 80a and 80b, by electric fields 82.

FIG. 3C illustrates a source of radio frequency interference within loop 80 due to a surrounding tangential electric field 82. More particularly, FIG. 3C illustrates tangential orientation of field 82 relative to loop 80 and perpendicular orientation relative to axis of symmetry 80c. Current flow 84, individually current flows 84a and 84b, within loop 80 produces a net current through terminals 80a and 80b, i.e., through a receiver when connected thereto. Current flow 84b, forced across the break 80d of loop 80, causes net current flow relative to terminals 80a and 80b. Accordingly, for the relative orientation illustrated in FIG. 3C, electric field 82 produces radio frequency interference in a radio signal taken at terminals 80a and 80b.

Thus, loop 80 as illustrated in FIG. 3C suffers radio frequency interference relative to electric field 82 when tangential to its plane and perpendicular to its axis of symmetry 80c. Important to note, however, the interior of loop 80, as shown in FIG. 3C, is shielded against this interfering tangential electric field 82.

Figure 4:
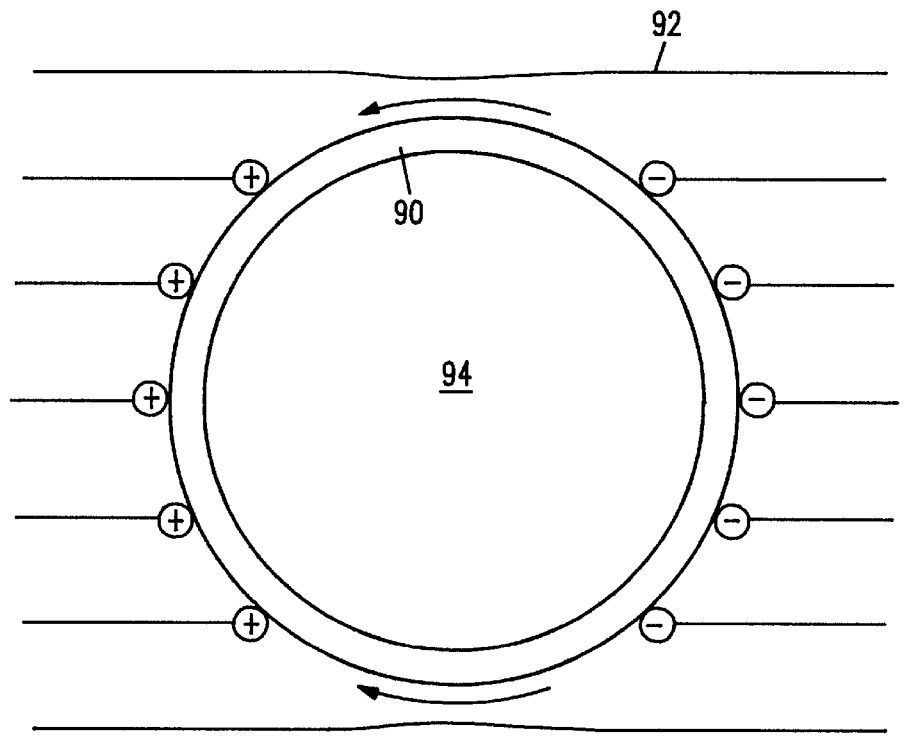
FIG. 4 illustrates a conductive ring within a tangential electric field and shielding provided thereby in the interior planar area of the conductive ring.

FIG. 4 illustrates a conductive ring in a tangential electric field 92, and by analogy illustrates the shielding effect provided by antenna loop 30 relative to interfering electric field 16. Currents flow in the outer edge of conductive ring 90 until a charge distribution along the outer edge of ring 90 cancels the electric field inside the ring 90, i.e., no tangential electric field exists within ring 90. In other words, no interfering electric field exists within the interior planar area 94 of conductive ring 90, all locations on ring 90 being at the same potential. By analogy, antenna loop 30 shields the magnetic pickup loop 32 from any external electric fields tangential to, i.e., within the plane of, loop 30. By symmetry, perpendicular electric field lines have no effect so long as one obtains a differential signal.

The antenna of the present invention provides a shielded region, i.e., shielded against interfering, i.e., tangential, electric field radio frequency (RF) interference, while providing within the shielded area a concentrated magnetic flux derived from the desired radio signal. The magnetic pickup loop 32, within and coplanar to the antenna loop 30, intersects the concentrated magnetic flux and provides terminals for collecting the radio signal power.

Figure 5:
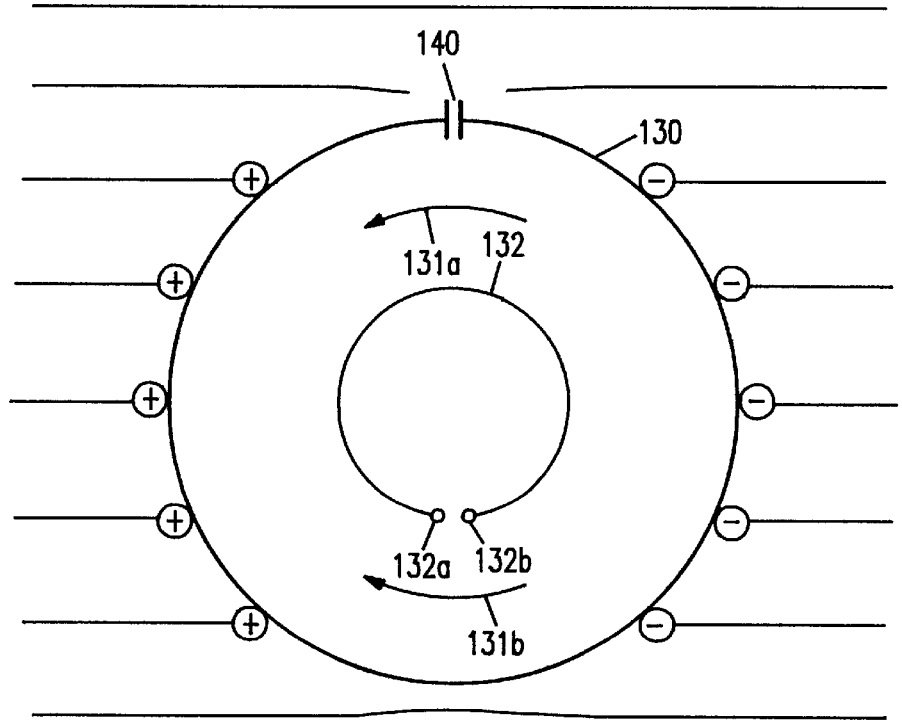
FIG. 5 illustrates schematically an antenna structure according to the present invention including an antenna loop with series capacitance establishing a selected resonant frequency and a magnetic pickup loop within and coplanar to the antenna loop.

FIG. 5 illustrates schematically use of a surrounding antenna loop 130 acting as a shield relative to an external electric field 116. Capacitor 140 interposed as a break in loop 130 is selected to resonate antenna loop 130 at a desired frequency. Antenna loop 130 is electrically small, i.e., it is significantly smaller than the wavelength of the desired frequency. Magnetic pickup loop 132 lies centrally relative to and within the plane of antenna loop 130.

Capacitor 140 replaces the conventional antenna feed points, e.g., terminals 80a and 80b of FIGS. 3A–3C. A selected capacitive value in conjunction with the inductance of loop 130 establishes a selected resonance for antenna loop 130. Magnetic flux concentrated within antenna loop 130 passes through magnetic pickup loop 132 for coupling at terminals 132a and 132b to receiver 18, e.g., by way of a balanced cable. Loop 132 may be viewed as a loosely coupled secondary winding of a transformer. In this manner, loop 132 is magnetically coupled to antenna loop 130. Important to note, antenna loop 130 receives the radio signal and, due to the high Q resonance, concentrates magnetic flux thereof for collection by magnetic pickup loop 132.

Placement of capacitor 140 in series with antenna loop 130 introduces some imbalance in current flow resulting from a surrounding tangential electric field. More particularly, current flow 131a and current flow 131b result from the surrounding electric field 116. Because capacitor 140 is in the path of current flow 131a, but not in the path of current flow 131b, a current flow imbalance results. Currents 131a and 131b are, therefore, not always equal in phase and magnitude because of capacitor 140. This can produce a net magnetic flux through loop 132 and thereby undesirably induce voltage, i.e., interference, across terminals 132a and 132b.

Figure 6:
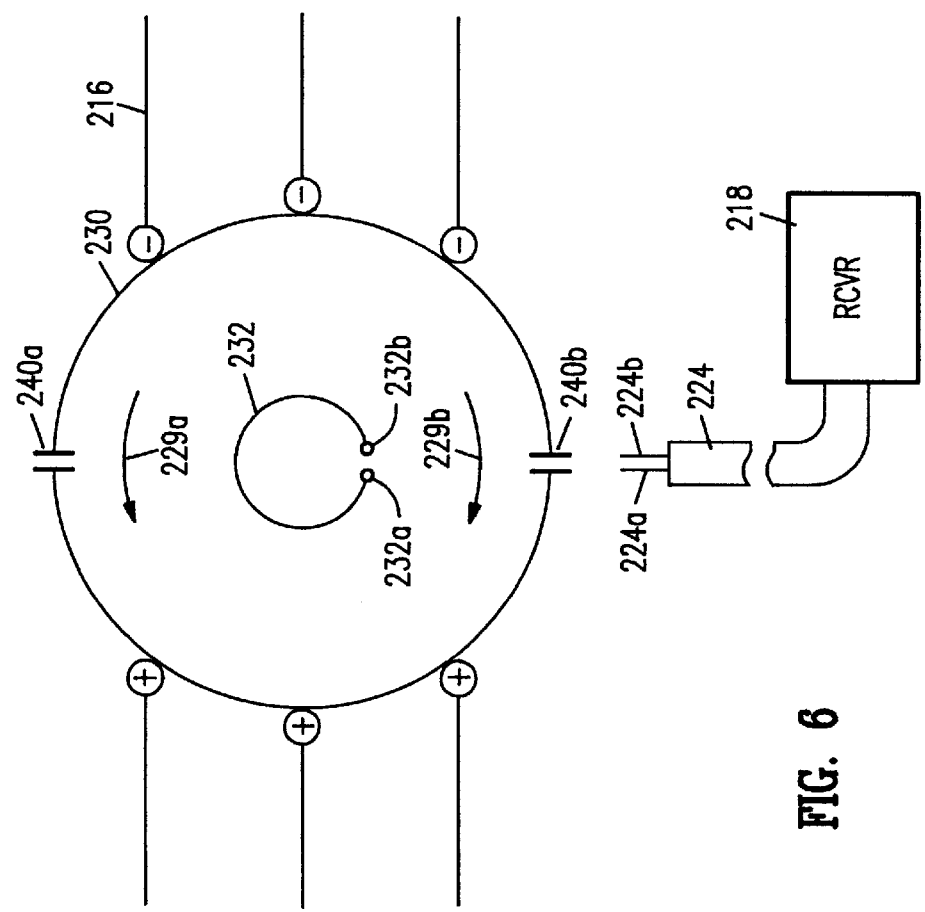
FIG. 6 illustrates a second embodiment of the present invention including split capacitance in establishing a fixed resonant or tuning frequency.

FIG. 6 illustrates a most preferred configuration of the present invention as a solution to the imbalance of current flow in the embodiment of FIG. 5. As may be appreciated, the embodiment of the present invention illustrated schematically in FIG. 6, as well as FIG. 7, may be implemented on a printed circuit board as described herein above with respect to the embodiment of FIG. 2. In FIG. 6, tuning capacitance 240 is split at capacitors 240a and 240b. Each of capacitors 240a and 240b have a value of twice a selected capacitance, e.g. that of capacitor 140 in FIG. 5, necessary to tune antenna loop 230 to a selected radio signal frequency. Magnetic pickup loop 232 rests symmetrically, i.e., centered, within antenna loop 230. Current flow induced in loop 230 as a result of the surrounding electric field 216, individually current flows 229a and 229b, passes through capacitance 240, individually through capacitors 240a and 240b, symmetrically. Thus, the net magnetic flux through magnetic pickup loop 232 created by current flows 229a and 229b is zero and no magnetic coupling between magnetic pickup loop 232 and the current 229 created by the interfering electric field 216 exists.

A balanced twin lead cable 224, i.e., having two identical signal conductors 224a and 224b, couples receiver 218 to terminals 232a and 232b of magnetic pickup loop 232. In this configuration, the magnetic pickup loop 232 is centered within antenna loop 230 and a differential signal taken from the terminals 232a and 232b provides radio signal power. This antenna arrangement enjoys freedom of orientation relative to the interfering electric field 216 and provides a radio signal substantially less sensitive to an interfering surrounding electric field.

In summary, by symmetry a perpendicular electric field produces no differential voltage at terminals 232a and 232b. Tangential electric field 216 is shielded against interaction with the inner magnetic pickup loop 232 by means of the outer antenna loop 230, and therefore field 216 produces no voltage variation at terminals 232a and 232b. Currents 229a and 229b induced in the antenna loop 230 by tangential electric field 216 are symmetric and thus produce no net flux through magnetic pickup loop 232, producing therefore no voltage differential at terminals 232a and 232b.

Figure 7:
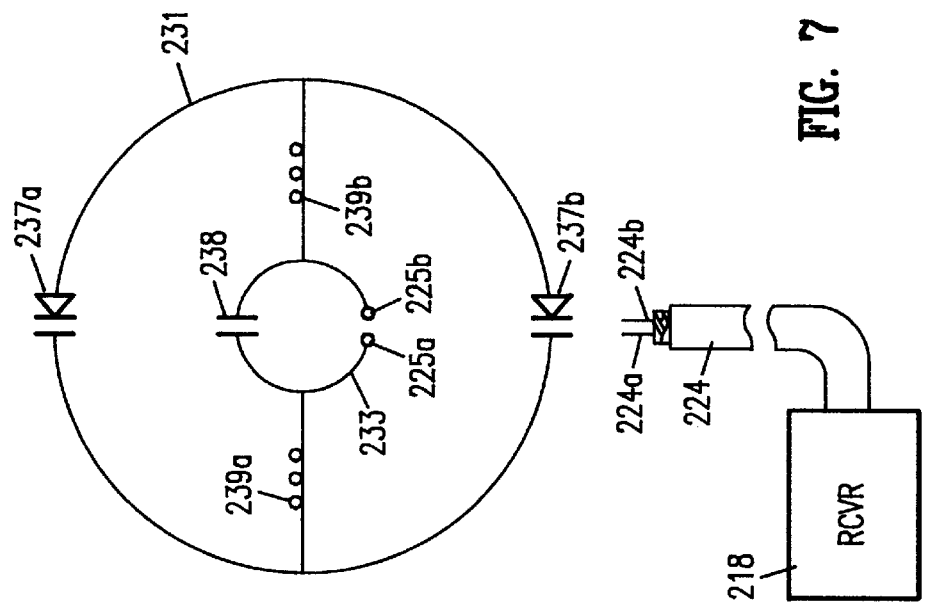
FIG. 7 illustrates a further embodiment of the present invention including variable split capacitance to establish a selected resonant frequency by application of a DC tuning voltage.

FIG. 7 illustrates incorporation of variable capacitors (varactors) and application of a DC tuning voltage, via twin lead cable 224, for selectable tuning of the antenna configuration illustrated in FIG. 6. In FIG. 7, varactors 237a and 237b replace capacitors 240a and 240b to provide variable capacitance, and therefore selectively variable resonance, in the antenna loop 231. Inductors 239a and 239b DC couple magnetic pickup loop 233 with outer antenna loop 231. Inductors 239a and 239b block radio frequency energy conduction between the antenna loop 231 and magnetic pickup loop 233. Capacitor 238, interposed symmetrically opposite relative to terminals 225a and 225b of magnetic pickup loop 233, blocks DC current between terminals 225a and 225b. Terminal 225a receives via twin lead cable 224 a positive varactor control voltage and terminal 225b receives a negative varactor control voltage. Magnetic pickup loop 233 rests symmetrically, i.e., centered, relative to the outer antenna loop 231. Thus, the antenna configuration of FIG. 7 tunes to a selected radio signal frequency by application of a DC tuning voltage, via twin leads 224a and 224b of cable 224 coupled to terminal 225a and 225b, for improved reception therefrom.

Thus, an improved loop antenna with reduced electrical field sensitivity has been shown and described. The antenna of the present invention shields interfering, i.e., tangential, electric field lines and concentrates magnetic flux lines within an antenna loop. The concentrated magnetic flux lines intersect a coplanar magnetic pickup loop within the antenna loop. A radio signal taken from the magnetic pickup loop is less sensitive to interference caused by an adjacent source of radio frequency electrical field interference, i.e., caused by an adjacent computing device. The antenna of the present invention may be made sufficiently small to meet product design criteria including small overall package form while still reliably receiving a radio signal in establishing a wireless link for a computing device. The antenna of the present invention is particularly well suited for application as a small, high Q antenna where the circumference of the loop antenna is substantially smaller than the radio signal wavelength of interest.

It will be appreciated that the present invention is not restricted to the particular embodiment that has been described and illustrated, and that variations may be made therein without departing from the scope of the invention as found in the appended claims and equivalents thereof.

What is claimed is:

1. A radio signal receiving device for receiving radio signals of a particular frequency comprising:

a planar antenna loop structure;

a magnetic pickup device coplanar to said antenna loop structure, located within said antenna loop structure, and offset from the center of said loop structure, said magnetic pickup being electrically isolated at said particular frequency; and a radio signal receiving device coupled to said magnetic pickup device;

wherein the location of said magnetic pickup device relative to said antenna loop is selected to minimize capacitive coupling between said magnetic pickup device and said antenna loop.

2. A radio signal receiving device for receiving radio signals of a particular frequency comprising:

a planar antenna loop structure;

a magnetic pickup device coplanar to said antenna loop structure and located within said antenna loop structure said magnetic pickup being electrically isolated at said particular frequency;

radio signal receiving device coupled to said magnetic pickup device; and two series capacitors placed at two symmetrically opposite locations along said loop structure.

* * * * *